(12) United States Patent
Nuovo et al.

(10) Patent No.: US 6,756,969 B2
(45) Date of Patent: *Jun. 29, 2004

(54) KEYPADS FOR ELECTRICAL DEVICES

(75) Inventors: Frank Nuovo, Los Angeles, CA (US);
Todd Wood, Los Angeles, CA (US);
Seiji Morioka, Los Angeles, CA (US);
Eduardo Salazar, Woodland Hills, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/431,150

(22) Filed: May 7, 2003

(65) Prior Publication Data

US 2003/0193480 A1 Oct. 16, 2003

Related U.S. Application Data

(63) Continuation of application No. 09/703,021, filed on Oct. 31, 2000, now Pat. No. 6,593,914.

(51) Int. Cl.[7] .................................................. G09G 5/00
(52) U.S. Cl. ..................... 345/169; 341/22; 379/433.07
(58) Field of Search ................................. 345/168–172; 341/22, 23; 379/433.07, 433.1, 433.6

(56) References Cited

U.S. PATENT DOCUMENTS

| 5,416,498 | A | * | 5/1995 | Grant | 345/168 |
| 6,297,795 | B1 | * | 10/2001 | Kato et al. | 345/684 |
| 6,373,501 | B1 | * | 4/2002 | Fiero | 345/700 |
| 2003/0048262 | A1 | * | 3/2003 | Wu et al. | 345/173 |

* cited by examiner

Primary Examiner—Regina Liang
(74) Attorney, Agent, or Firm—Steven A. Shaw

(57) ABSTRACT

A mobile telephone includes a body, a display, and a keypad. The keypad has a plurality of individual numeral keys assigned to individual numerals and may be rotated with respect to the body. In this way it is possible for the presentation of information on the display to remain in a fixed orientation with respect to a user while the body is rotated about the display so that the mobile telephone can be converted from right-handed to left-handed use or the display can be moved from a first orientation to a second orientation.

4 Claims, 3 Drawing Sheets

KEYPADS FOR ELECTRICAL DEVICES

CROSS-REFERENCE TO RELATED APPLICATION

This is a Continuation of and claims benefit under 35 U.S.C 120 to U.S. patent application Ser. No. 09/703,021 filed on Oct. 31, 2000, now U.S. patent application Ser. No. 6,593,914 issued on Jul. 15, 2003.

BACKGROUND

This invention relates to mobile communication systems and, more specifically, to keypads for mobile communication devices.

In order for mobile telephones to be conveniently used, they are of a relatively small size. Accordingly, the keypads of such devices are also small. This is particularly the case since, not only are smaller mobile telephones being manufactured, but it is becoming desirable to have larger displays on such devices which means that there is less space available to provide a keypad.

For such small keypads, an important factor is the ease with which they may be used by a user. A keypad should enable a user to select keys rapidly, in a way that is natural, intuitive and without involving unnecessary finger movement.

Keypads for mobile telephones generally have a common, basic, configuration shown in FIG. 1. Keys which are used in dialling numbers, as well as for other purposes, are typically provided in a 4 by 3 matrix having a first row of numerals "1", "2", and "3", a second row of numerals "4", "5", and "6", a third row of numerals "7", "8", and "9" and a fourth row having a first character/function key, numeral "0", and a second character/function key. Another arrangement of keys, which is usually located above this arrangement, is used to carry out other functions, such as initiating and terminating telephone calls and navigating around the screen and various menus of a user interface of the mobile telephone.

One disadvantage of this arrangement is that there is little natural spatial correspondence between the locations of the keys and the selectable numerals. For example, although key 6 is adjacent to one key 5 (as a row neighbor), it is also below key 3 and above key 9 (as two column-neighbors). Therefore, use of such a keypad needs to be learned by a user. For example, it is not unusual for a user to remember the input sequence of a telephone number or a code by remembering the pattern of finger movements used in inputting the telephone number or code.

Another disadvantage of such a keypad is that if it is used in an orientation other than the one originally intended, it becomes difficult for a user to select the correct keys. For example, if the keypad of FIG. 1 is rotated clockwise through 90°, the keys then appear to a user to be in a 3 by 4 matrix and the spatial relationships between keys also appear to have changed. Key 6 now has two row-neighbors, keys 9 and 3 and one column-neighbor, key 5. This is confusing because a user cannot readily apply learned spatial relationships. In addition, any text associated with the keys will also have rotated and will be more difficult to read.

To deal with these difficulties WO 98/24103 and WO 99/48120 propose alternative keypad arrangements for mobile telephones, wherein numeral keys are disposed in a generally oval configuration.

However, such keypads are still difficult to use if the mobile telephone or device is used in an alternative orientation. Therefore, what is needed is a device with a keypad that can be rotated with respect to the device's body without loss of spatial orientation.

SUMMARY

Accordingly, a device is provided that includes a body, a display, and a keypad, wherein the keypad may be rotated with respect to the body.

In this way it is possible for the orientation of the display to be changed with respect to the body while the body is rotated about the keypad. This may be used to maintain a particular orientational relationship between the keypad and the display. This may be useful in allowing the mobile terminal to be used in alternative orientations.

The keypad may be rotated by a user to optimise the electrical device for both horizontal and vertical viewing modes. It is particularly convenient in providing ready right- and left-handed usability. In this way it is possible for a user to change use of such a display from a portrait mode to a landscape mode while maintaining the orientation of the keypad.

In an embodiment, the keys are circularly disposed in numerical order, and their positions and their sequence have a logical correspondence. This can provide a convenient keypad wherein location of the keys is straightforward.

DETAILED DESCRIPTION

Figure 2:
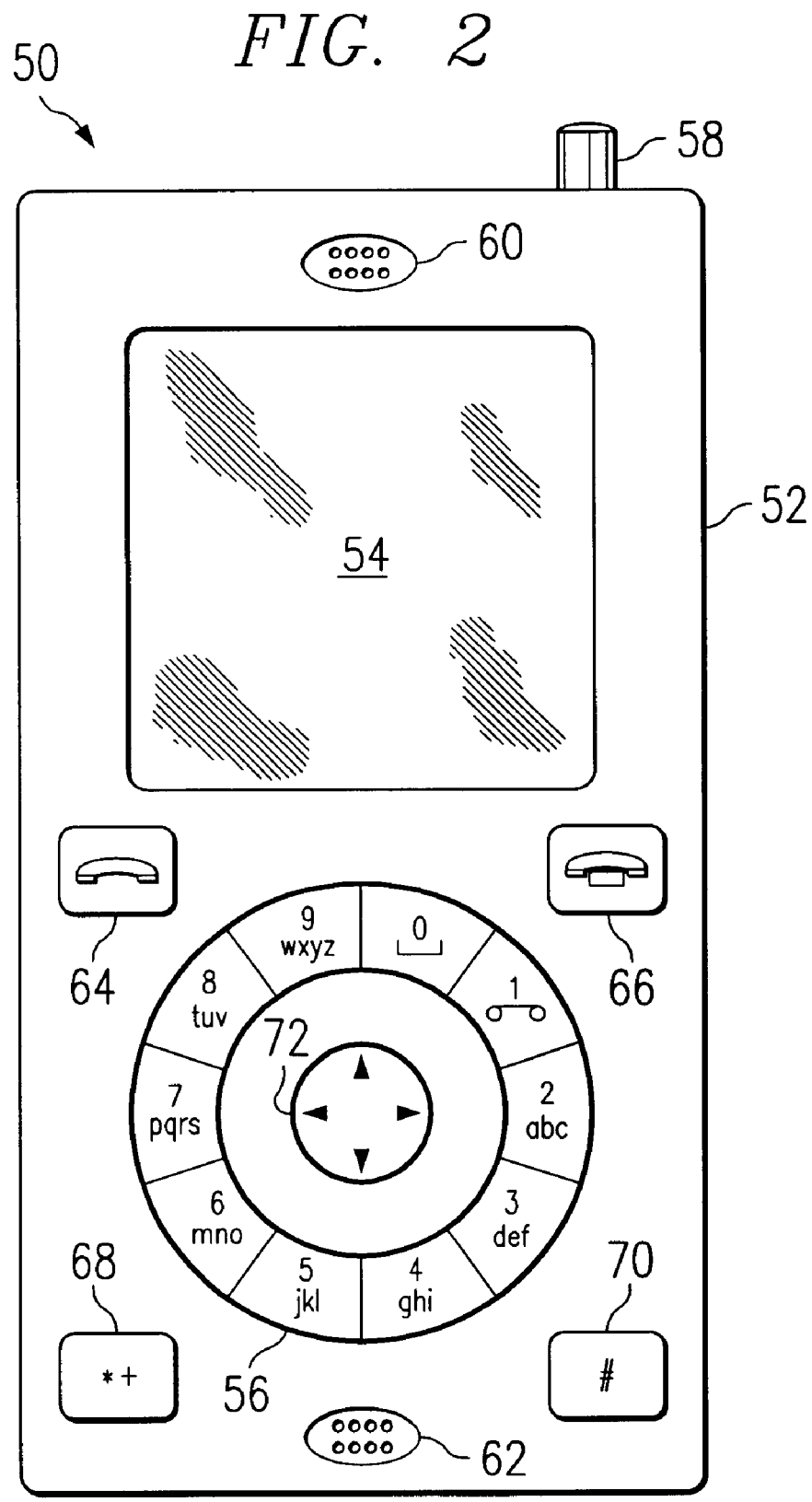
FIG. 2 shows a mobile terminal according to an embodiment of the invention.

Referring now to FIG. 2 a mobile terminal 50 includes a body 52, a display 54, a keypad 56, an on/off button 58, an earphone 60, and a microphone 62. The display 54 has a non-unity aspect ratio. The keypad 56 can be moved relative to the body 52 by a motor drive or manually, as discussed in detail below. Additionally, the keypad 56 is removable. It may be "rotated" by being removed from the electrical device and then being replaced in an alternative configuration. In this way, both the orientation of the keys and the orientation of the display may both be changed so that they maintain a correspondence.

The keypad 56 includes a keymat that includes a plurality of keys located above a pressure sensitive part. The pressure sensitive part has a plurality of pressure sensitive areas that detect key-presses and produce corresponding electrical signals. An individual key includes a part of the keymat and its corresponding pressure sensitive area on the pressure sensitive part.

Individual keys are dedicated to the operation of the mobile terminal 50 and include keys to initiate and terminate calls, 64 and 66, respectively, an asterisk key 68, and a pound or hash key 70. The keypad 56 includes a set of numerical keys disposed in a circular arrangement around a centrally located navigation key 72. The navigation key 72 may be used, among other things, to control movement of a cursor in the display or to move a selection highlighter through menus in the display. The term "navigation key" refers to any suitable manually operable input receiving means and includes such things as joysticks, rollers, and the like.

The numeral keys 1 to 9 and 0 are provided adjacent to one another in a circular arrangement, such that neighboring numeral keys are in numerical order. The numeral keys are arranged in an annulus, and the annulus may be rotated. The navigation key may also be rotated. The annulus and the navigation key may be keyed together so that they rotate together. The annulus may include a single integrated piece or it may include a plurality of separate pieces. In the latter case, a separate piece is assigned to each of the numeral keys. Separate pieces may be able to move relatively to each other, for example when there is a key-press for a particular key.

In one embodiment key "0" is located between keys "9" and "1". The asterisk key 68 and the hash key 70 are located outside the circular arrangement. However, in an alternative embodiment, these keys could be located inside the circular arrangement of the keypad 56 or indeed as part of the circular arrangement of the keypad 56. In the latter case, one preferred arrangement is for the sequence of keys to be arranged in locations corresponding to a clock face in which keys "1" to "9" have locations corresponding to clock face numerals "1" to "9", key "0" has a location corresponding to clock face numeral "10", the asterisk key has a location corresponding to clock face numeral "11" and the hash key has a location corresponding to clock face numeral "12".

The numeral keys are disposed in the form of an annulus surrounding the navigation key 72. The annulus is segmented into separate pieces each of which can be individually pressed without necessarily causing pressing of any other part of the annulus. In an alternative embodiment, the numeral keys are not disposed about the navigation key 72.

The keys are not only used for numerical input but they are also used to input alphabetical and other characters. For example, the key "2" typically has an alphabet of characters "2", "a", "b" and "c". Although other characters may be present, for example equivalents of these characters in other languages, only these four characters will be considered for the sake of simplicity. In normal telephone mode of the mobile terminal 50, pressing key "2" selects numeral "2"; in other modes, for example in writing short message service (SMS) messages, the letter "a" is selected by a single key-press of this key, letter "b" is selected by a double key-press of this key, letter "c" is selected by a triple key-press of this key and so on. Other letters of the alphabet are present on other keys. The key "1" also has a set of punctuation marks assigned to it. The alphabetical characters and punctuation marks, as well as the numerical characters, can be used in the writing of text, for example, SMS messages.

The keymat of the keypad 56 is configured to rotate with respect to the body 52. The mobile terminal 50 includes angular orientation measurement means that can measure the angular orientation of the keymat with respect to the body and change the mapping of the keymat to the corresponding pressure sensitive areas so that pressing a particular key produces an electrical signal, which is understood by the mobile terminal 50 as being associated with that key. An advantage of this is that the angular orientation, in which the mobile terminal 50 is used, can be changed. Thus, the mobile terminal 50 can be turned on its side while still presenting its display 54 to user and the orientation of the display 54 with respect to the body 52 can be changed so that it is in a different orientation, for example in a landscape orientation rather than in a portrait orientation. It may be convenient to connect the display 54 to the angular orientation measurement means so that an angular change of the orientation of the keymat of the keypad 56 additionally causes an angular change in the presentation of an image on the display 54. For example, the keymat of the keypad 56 and the image being displayed could both be rotated by 90°. This could be useful if the display 54 is being used to display an image that is not suitable to the aspect ratio of the display.

The mobile terminal 50 is provided with locking means that locks the keymat and the body 52 into a particular orientation. The locking means may lock the keymat and the body 52 so that no relative movement is permitted between them or so that relative movement is only permitted when a sufficiently high rotational force is applied to the keymat.

Allowing the user to rotate the keymat for horizontal or vertical display presentation or for right- or left-handed use provides improved usability of the mobile terminal 50. Furthermore, an interchangeable keymat allows the user to config. the hardware interface of the mobile terminal 50 in a way that is convenient and suitable to their needs and preferences. The keypad 56 and the body 52 may have complementary decorative patterns so that the patterns match when a key and a pressure sensitive area are in registration. Alternatively, the patterns may be such that there are different degrees of matching between the keymat and the body 52 at different angular orientations at which the keys are in registration with the pressure sensitive areas.

If interchangeable keymats are used, this may provided a suitable way to "rotate" the keymat. The keymat may be removed from the mobile terminal 50 and then be replaced in an alternative configuration. Of course, the mapping between the keys of the keymat and their corresponding pressure sensitive areas would also be changed so that pressing a particular key produces an appropriate electrical signal. Additionally, the orientation of the display 54 may be correspondingly changed so that the keymat and the display 54 are in matching orientations.

The navigation key 72 can be either self-orientating like the display or it can be part of the keymat that is moved or removed and replaced. If it is self-orientating, it remains in place when the keymat is removed and the mapping between arrow functions of the navigation key 72 and corresponding pressure sensitive areas are changed.

In another embodiment, the annulus is a single integral piece having zones disposed at different angular positions assigned to different numerals. Pressing different zones causes different numerals to be selected and entered into the display.

Figure 3:
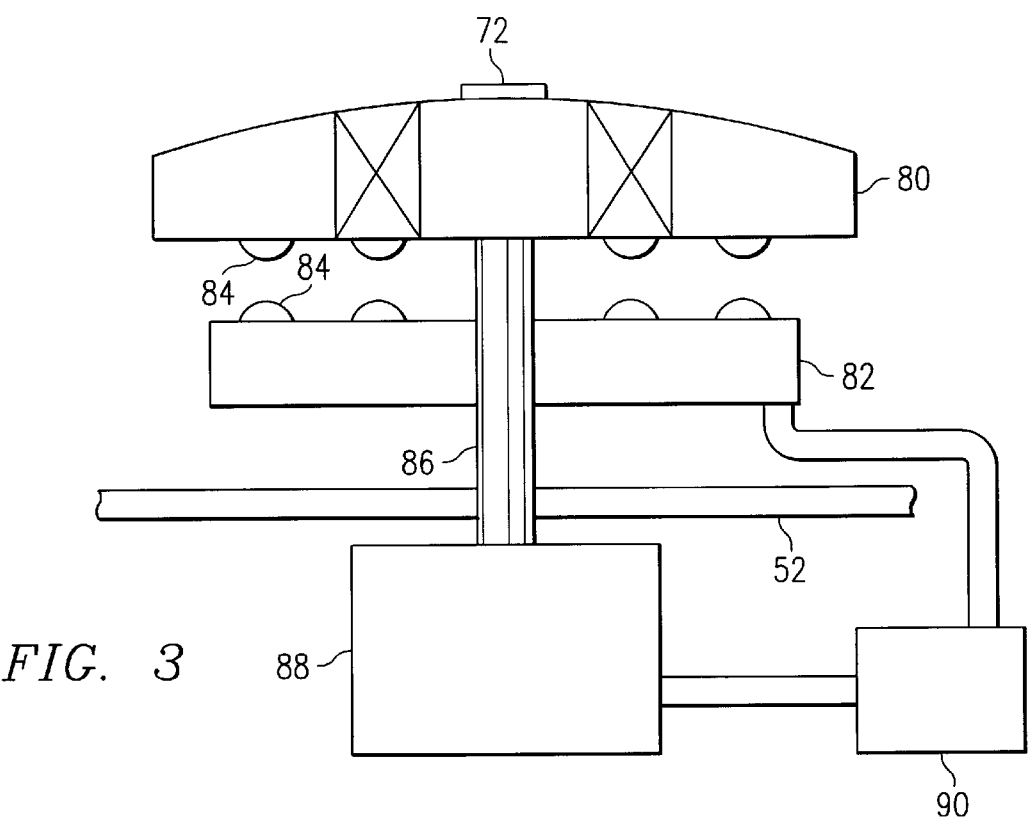
FIG. 3 is a cross sectional detail view of the keypad of FIG. 2.

FIG. 3 shows detail of the keypad 56 of FIG. 2 and the body 52 is shown as a fragmented part. It shows, in side view, a keymat 80 and a pressure sensitive pad 82 located beneath it. For illustrative purposes, the keymat 80 and the navigation key 72 are keyed together against relative rotational movement, such that they are an integral piece. Both the keymat 80 and the pressure sensitive part 82 have cooperating contact points 84. The keymat 80 is connected via an axle 86 to an electric motor 88. The motor 88 is able to drive the keymat relative to the pressure sensitive part 82 and the body 52.

The pressure sensitive pad 82 and the motor 88 are both connected to, and controlled by, a controller 90 that ensures the keymat 80 is rotated by the motor 88 and the mapping of corresponding contact points 84 is changed. Accordingly, pressing a particular numeral key of the keymat 80 produces the appropriate electrical signal and the mobile terminal 50 correctly recognises the key-press.

Figure 4:
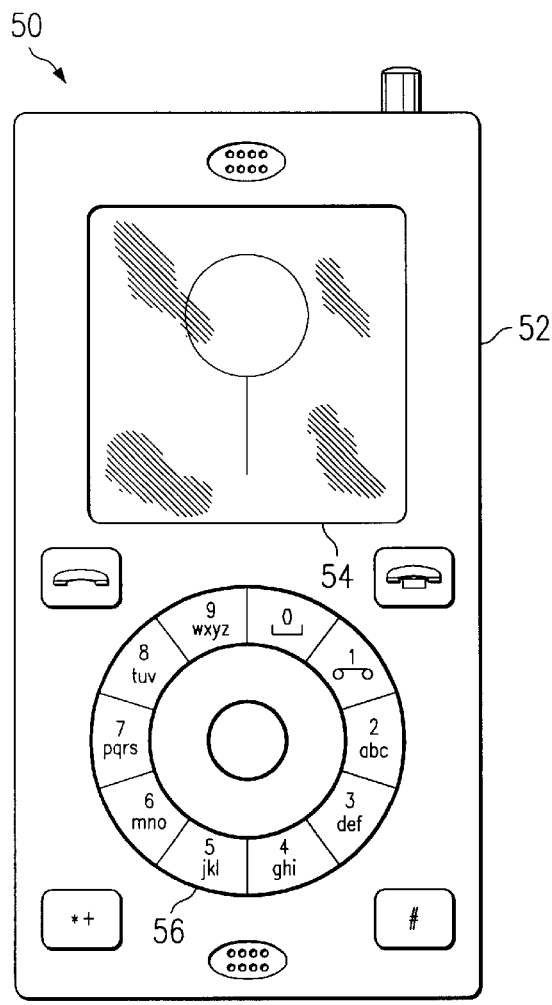
FIG. 4 shows the mobile terminal of FIG. 2 in one orientation.
Figure 5:
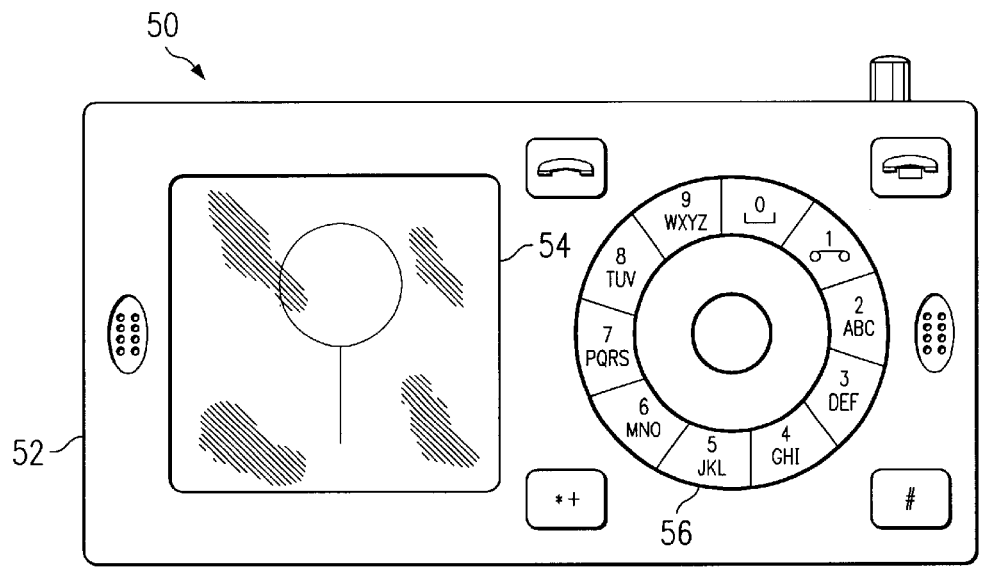
FIG. 5 shows the mobile terminal of FIG. 2 in another orientation.

The effect of rotating the keypad 56 is shown in FIGS. 4 and 5. The keypad 56 has been rotated 90° clockwise and the orientation of an image presented on the display 54 has been correspondingly changed. Therefore, in relation to FIG. 5, a user now uses the mobile terminal 50 (and its user interface) in an orientation that it extends mostly in a horizontal direction. The two numerals, 0 and 5, shown on the keypad 56 are simply to illustrate its orientation relative to the mobile terminal 50.

Figure 1:
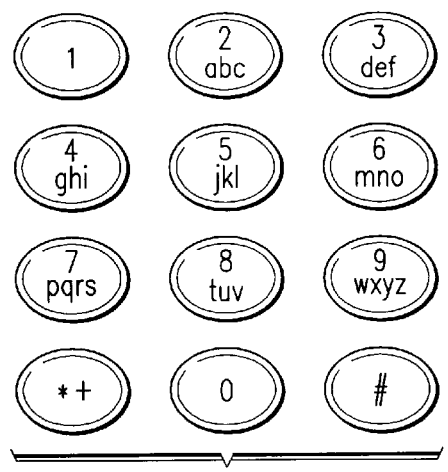
FIG. 1 shows a prior art keypad.

In all of the preceding embodiments of the inventions, other arrangements of keys may be used. For example, the keys may be arranged alphabetically according to the alphabetical letters assigned to the keys. In such an alphabetical layout, there may be more than ten keys assigned to alphabetical letters arranged in a circle. The keys may be arranged in a so-called QWERTY layout in which each individual letter is assigned to a corresponding individual key or pluralities of letter are assigned to corresponding individuals keys, as shown in FIG. 1, but the sequence of letters follows the QWERTY sequence rather than being alphabetical.

Although reference is made to key-presses and pressing of keys, it is to be understood that an electrical device according to the invention may receive input by pressing of keys or by some other means. Furthermore, the foregoing description relates to a mobile terminal such as a mobile telephone, and it is understood that the invention can be applied to other devices such as computers, personal digital assistants, and entry terminals for inputting data or access codes, for example to gain access to a building or to another secure location.

Particular implementations and embodiments of the invention have been described. It is clear to a person skilled in the art that the invention is not restricted to details of the embodiments presented above, but that it can be implemented in other embodiments using equivalent means without deviating from the characteristics of the invention.

What is claimed is:

1. An electrical device comprising:

a body;

a display disposed in the body for the display of images and data;

angular orientation measurement means which can measure the angular orientation of the keymat with respect to the body;

a keypad in which the keypad is rotatable with respect to the body;

an interchangeable keymat coupled to the keypad, wherein the keymat defines a plurality of individual numerical keys and a plurality of pressure sensitive areas which detect key presses and produce corresponding electrical signals; and in which the plurality of individual numeral keys and the navigation key are keyed together so that are rotatable together.

2. An electrical device according to claim 1 in which the keypad is rotatable by hand.

3. An electrical device according claim 1 in which rotation of the keypad is driven by an electrical motor.

4. An electrical device comprising:

a body;

a display disposed in the body for the display of images and data;

angular orientation measurement means which can measure the angular orientation of the keymat with respect to the body;

a keypad in which the keypad is rotatable with respect to the body;

a plurality of pressure sensitive areas which detect key presses and produce corresponding electrical signals; and an interchangeable keymat defining a plurality of individually labeled keys coupled to said keypad, each of the individually labeled key maps to a one of the said plurality of pressure sensitive areas and wherein the mapping between the keys of said keymat and their corresponding pressure sensitive areas may be changed by placing the keymat in different configurations thereby allowing for coded input of data.

* * * * *